Jan. 7, 1941.    V. E. VERRALL    2,227,989
PROTECTIVE ARRANGEMENT
Filed Oct. 28, 1939
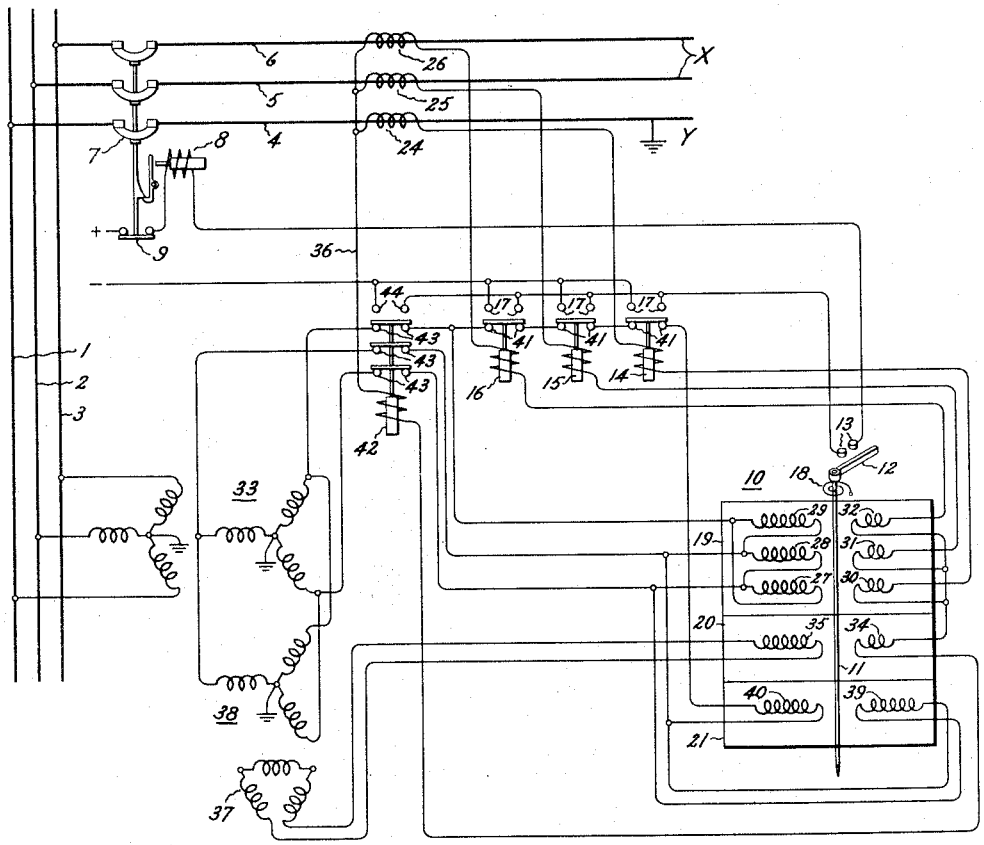
Inventor:
Victor E. Verrall,
by Harry E. Dunham
His Attorney.

Patented Jan. 7, 1941

2,227,989

UNITED STATES PATENT OFFICE

2,227,989

PROTECTIVE ARRANGEMENT

Victor E. Verrall, Upper Providence Township, Delaware County, Pa., assignor to General Electric Company, a corporation of New York Application October 28, 1939, Serial No. 301,813

10 Claims. (Cl. 175—294)

My invention relates to improvements in protective arrangements for electric systems and more particularly to improvements in protective arrangements for alternating current systems wherein discrimination on the basis of the flow of fault power is desired by a single device which is jointly responsive to the flow of both polyphase power and zero phase sequence power and may also be subject to another control which provides a distance response such as to render the polyphase power response immune to load conditions.

In order to simplify control circuits, such for example as circuit breaker tripping circuits, and to reduce the number of contacts, when both ground and phase fault power directional responsive relays are requisite to the protection desired, it has been proposed to have both the polyphase power effect and the ground fault power effect operative on a single contact controlling member. This leads to the possibility that, under some conditions of load power flow, there may be on the occurrence of a ground fault insufficient ground fault power effect to cause the desired discriminating action. To avoid this possibility of erroneous action, it has been proposed to make the ground fault power effect great enough to insure overcoming the load power effect regardless of its probable magnitude and direction. This means that each system has to be studied very carefully before applying such a combination relay so that the relay can be made to fit the system conditions. This necessity for individual relay fitting eliminates any possibility of a rational standard and the economies that a standard design can provide, to say nothing about simplifying the matter of application. Moreover, the windings necessary to insure the predominance of the ground fault power effect over the load power effect constitute a heavier volt ampere burden on the auxiliary transformers and produce a greater heating effect during ground faults. In addition, they increase the space requirements and raise the cost for materials. Also a distance effect, sometimes called a voltage restraint, is frequently desirable to render the relay immune to load power conditions, but this effect usually is not wanted during either phase faults or ground faults since it affects the sensitivity of the relay.

In accordance with my invention, I provide a protective relay arrangement which insures the desired discriminating phase fault power and ground fault power operation with a power directional relay having a single movable element and which is generally applicable to any polyphase system without particular windings or other special features whereby to eliminate the disadvantages associated therewith. Further, in accordance with my invention, I also obtain the desired distance effect or immunity to load operation without impairing the desired sensitivity of either phase or ground fault response. These and other objects of my invention will appear in more detail hereinafter.

My invention will be better understood from the following description when considered in connection with the accompanying drawing, and its scope will be pointed out in the appended claims.

The single figure of the accompanying drawing illustrates an embodiment of my invention in a protective arrangement for a polyphase, three-phase as shown, alternating current system comprising buses 1, 2 and 3 to which are respectively connected the phase conductors 4, 5 and 6 of a power line through suitable circuit interrupting means such as a circuit breaker 7. For purposes of illustration this is shown simply as a latched closed circuit breaker provided with a trip coil 8 and an "a" auxiliary switch 9 which is closed when the circuit breaker is closed and opened when the circuit breaker is opened.

In order, on the occurrence of a fault involving one or more of the power line conductors 4, 5 and 6, to effect the operation of the circuit breaker 7 with a discriminating action dependent on the direction of fault power in the line at the point where the circuit breaker is located, I provide suitable means, such as a power directional relay 10 having a movable contact controlling member indicated schematically as a shaft 11 carrying a contact arm 12 which is arranged to bridge contacts 13. For biasing the contact member 12 to the circuit opening position when the relay 10 is deenergized, there may be provided suitable means such as a spring 18.

As shown, the contacts 13 are arranged in series in the circuit of the trip coil 8. Also, as is customary in the art to which my invention pertains, there may be employed one or more fault responsive devices or detectors, such as phase overcurrent relays 14, 15, 16, for example, which are provided with circuit closing contacts 17 connected in parallel with each other and in series with the power directional relay contacts 13 and the trip coil 8. As shown, the phase overcurrent relays 14, 15, 16 are respectively connected to be energized in accordance with the currents in the phase conductors 4, 5 and 6 through the medium of current transformers 24, 25, 26.

As illustrated, the power directional relay 10 comprises three electroresponsive means or elements 19, 20 and 21 all of which are effective on the one movable member 11. The electroresponsive means or element 19 is such as to exert on the movable element 11 an effect dependent on the polyphase power flowing in the power line 4, 5, 6. The electroresponsive means or element 20 exerts a controlling effect on the movable member 11 such as to tend to close the contacts 13 for ground fault power flow in a predetermined direction. The element 21, which may or may not always be provided, is a voltage restraining element which exerts an effect tending to oppose the polyphase power effect of the element 19 for power flow in a given direction so as to tend to prevent the contact controlling member 12 from bridging contacts 13. The purpose of electroresponsive means 21 is to provide a distance response such as to render the polyphase power response of the element 19 ineffective under load conditions.

The electroresponsive polyphase power element 19 may be of any suitable type, examples of which are well known to the art. Thus, for example, it may be of the induction disk type comprising either two or three disks with the necessary motor elements to give polyphase power response, as is well known to the art, or it may be of the multiple unit induction cup type disclosed in United States Letters Patent 2,110,686 or the single unit induction cup type disclosed in United States Letters Patent 2,110,673 and 2,110,676. Since the particular construction of the polyphase power element 19 forms no part of my invention, it is shown as comprising a plurality of voltage windings 27, 28 and 29 which cooperate with current windings 30, 31 and 32 to produce a polyphase power torque whose magnitude and direction are dependent on the direction of the polyphase power flow in the line 4, 5, 6. The current windings 30, 31 and 32 are respectively connected to be energized in accordance with the currents in the phase conductors 4, 5 and 6 through the medium of the current transformers 24, 25 and 26. The voltage windings 27, 28 and 29 are connected to be energized in accordance with predetermined phase voltages of the system through the medium of a potential transformer 33 which is connected to be energized from the buses 1, 2, 3, as shown. The illustrated voltage and current connections are shown merely for purposes of explaining my invention. Of course, my invention is not limited to this or any specific set of connections.

The ground fault directional element 20 may be of any suitable type, examples of which are well known to the art. Thus it may be of the induction disk type or of the induction cup type disclosed in the aforesaid Patent 2,110,686. It is shown schematically as comprising cooperating current and voltage windings 34 and 35, respectively. The current winding 34 is connected in the common lead 36 of the current transformers 24, 25 and 26 so as to be energized in accordance with the vector sum of the currents in the phase conductors 4, 5 and 6. The voltage winding 35 is to be energized in accordance with the resultant or residual voltage to ground of the system. For this purpose it may be connected in series with the open delta connected windings 37 of a potential transformer 38 which may be connected to be energized from the potential transformer 33, as shown. Thus with this connection, as is well known to the art, the electroresponsive device 20 on the occurrence of ground fault power flow exerts a torque which is a measure of the zero phase sequence power of the system.

The voltage restraining element 21, which may or may not be provided, may also be of any suitable type, examples of which are well known to the art. Thus it may be of the well known induction disk type or of the induction cup type disclosed in the aforesaid Patent 2,110,686. As shown schematically, it comprises two cooperating voltage windings 39 and 40 which are respectively connected to be energized in accordance with two phase-to-phase voltages of the system under protection. For this purpose these windings may be connected to be energized from the potential transformer 33, as shown. The voltage restraining element 21 then exerts a torque dependent on a function of these voltages and the phase angle between them. This torque is so arranged through the connection of the windings 39 and 40 as to tend to turn the contact controlling member 11 oppositely to the contact closing direction or, in other words, to oppose the polyphase power element for power flow in a given direction. Since this restraining effect is only to render the relay immune to load conditions, it is desirable to eliminate it under fault conditions, and for this purpose the voltage restraining element 21 is to be rendered ineffective on the occurrence of a fault. This may be accomplished by connecting one of the windings 40, for example, in series with the series connected circuit opening contacts 41 of the phase fault detectors 14, 15 and 16.

Since a ground fault may occur under conditions for which the polyphase power effect of the element 19, due to the load flowing in the power line 4, 5, 6, is greater than the ground fault power effect of the element 20, it is possible that the load power effect may prevent the closing of the contacts 13 under conditions for which tripping of the circuit breaker 7 should occur. In order to avoid this condition, I provide, in accordance with my invention, means for reducing or entirely eliminating the polyphase power effect of the element 19 under predetermined abnormal conditions of the power line. Thus, in the illustrated embodiment of my invention I provide a ground fault detector such as an overcurrent relay 42 which has its winding connected in series in the residual lead 36 of the current transformers 24, 25 and 26 so as to be energized in accordance with the vector sum of the currents flowing in the phase conductors 4, 5 and 6. The ground fault detector 42 may, upon operation, be arranged either to reduce the energization of the polyphase power responsive element 19 or to eliminate it entirely. Thus, for example, the relay 42 may be provided with a plurality of circuit opening contacts 43 which are connected in series with the potential windings 27, 28 and 29 so that, upon operation of the relay 42, each of these windings is disconnected from the potential transformer 33. Upon such disconnection, of course, the power torque of the element 19 is eliminated so that correct response of the relay 10 is assured by the action of the ground fault power responsive element 20, assuming of course that no voltage restraining element 21 is present.

Since in those cases where the voltage restraining element 21 is provided the torque of such element would be disadvantageous in case of ground fault power flow, the voltage energization of this element may also be reduced or eliminated by the operation of the ground fault detector 42. Thus, as shown, the energizing circuit of the windings 39 and 40 may be carried through the contacts 43 of the ground fault detector 42 so as to be opened upon response thereof. The ground fault detector 42 may be provided with circuit closing contacts 44 which are connected in series with the contacts 13 in the circuit of the trip coil 8 as is well known to the art.

Under normal system conditions, the parts will be positioned as shown in the drawing. Assuming now an interphase fault, as indicated at X between the phase conductors 5 and 6, then two of the fault detector relays 15 and 16 will operate to open their contacts 41 and thereby eliminate the restraint of the voltage restraining element 21. If at this time there is no gound fault on the system, neither of the windings 34 and 35 of the ground fault power directional element 20 will be energized nor will the ground fault detector 42 operate. Consequently, there will be left to act on the movable element 11 of the power directional relay 10 nothing but the power torque of the polyphase power directional element 19 which in this case will operate to move the circuit controlling member 12 to bridge contacts 13. The closing of these contacts as well as the contacts 17 of one or more of the operating fault detectors 15 and 16 completes the circuit of the trip coil 8 whereby to effect the opening of the circuit breaker 7. In case of a fault to ground, as indicated at Y, on the phase conductor 4, then the ground fault detector 42 will operate to open its contacts 43 thereby eliminating the torque effects of the polyphase power directional element 19 and the voltage restraining element 21. Since there is now a ground on the system, the residual current will appear in the current winding 34 of the ground fault power directional element 20 and the residual voltage in the voltage winding 35 of this element. Consequently, this element 20 is free to operate without having its sensitivity or torque hindered by either of the other elements 19 and 21 and is accordingly effective to cause the contact controlling member 12 to bridge contacts 13. The closing of contacts 13 together with the closing of contacts 44 of the ground fault detector 42 completes the circuit of the trip coil 8 whereby to effect the opening of the circuit breaker 7.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with a polyphase alternating current system, a movable member, electroresponsive means connected to be energized in accordance with predetermined voltages and currents of said system for controlling the movement of said member in accordance with the flow of polyphase power at a predetermined point of the system, electroresponsive means connected to be energized from the system for controlling the movement of said member in accordance with the flow of ground fault power at said point, and means connected to be energized from the system for impairing the control of said polyphase power responsive means on the occurrence of a predetermined abnormal system condition.

2. In combination with a polyphase alternating current system, a rotatable member, means connected to be energized from the system to exert on said member a torque dependent on the flow of polyphase power at a predetermined point of the system, means connected to be energized from the system for exerting on said member a torque dependent on the flow of zero phase sequence power at said point, and means connected to be energized from the system operative to reduce the torque of said polyphase power means on the occurrence of a fault to ground on the system.

3. In combination with a polyphase alternating current system, a rotatable member, means connected to be energized from the system to exert on said member a torque dependent on the flow of polyphase power at a predetermined point of the system, means connected to be energized from the system for exerting on said member a torque dependent on the flow of zero phase sequence power at said point, means connected to be energized from the system for exerting on said member a torque dependent on a predetermined function of two voltages of the system opposed to said polyphase torque for power flowing in a predetermined direction, and means connected to be energized from the system operative on the occurrence of a ground fault thereon to eliminate said polyphase torque and said voltage opposing torque.

4. In combination with a polyphase alternating current system, a movable member, electroresponsive means connected to be energized in accordance with predetermined voltages and currents of said system for controlling the movement of said member in accordance with the flow of polyphase power at a predetermined point of the system, electroresponsive means connected to be energized from the system for controlling the movement of said member in accordance with the flow of zero phase sequence power at said point, restraining means connected to be energized from said system for controlling the movement of said member in accordance with a function of two voltages of the system, and means connected to be energized from the system responsive to a ground fault thereon to eliminate the control of said polyphase power responsive means and said voltage restraining means.

5. In combination with a polyphase alternating current system, a movable member, electroresponsive means connected to be energized in accordance with predetermined voltages and currents of said system for controlling the movement of said member in accordance with the flow of polyphase power at a predetermined point of the system, electroresponsive means connected to be energized from the system for controlling the movement of said member in accordance with the flow of zero phase sequence power at said point, and electroresponsive means connected to be energized from the system for eliminating the control of said polyphase power responsive means on the occurrence of a fault to ground on the system.

6. In combination with a polyphase alternating current system, a power directional relay comprising a movable contact member, means connected to be energized from the system in accordance with predetermined voltages and currents thereof for exerting on said member a torque dependent on the flow of polyphase power at a predetermined point of the system, and means connected to be energized from the system for exerting on said member a torque dependent on the flow of ground fault power at said point and a fault responsive relay operative on the occurrence of a ground on the system to eliminate the torque of said polyphase power responsive means.

7. In combination with a polyphase alternating current system, a power directional relay comprising a movable contact member, means connected to be energized from the system in accordance with predetermined voltages and currents thereof for exerting on said member a torque dependent on the flow of polyphase power at a predetermined point of the system, means connected to be energized from the system for exerting on said member a torque dependent on the flow of ground fault power at said point, and means for exerting on said member a torque dependent on a predetermined function of two voltages of the system opposed to said polyphase torque for power flowing in a predetermined direction and fault responsive relay means connected to be energized from the system operative on the occurrence of a ground fault thereon to eliminate said polyphase torque and said voltage opposing torque.

8. In combination with an alternating current system, a movable member, fault responsive means connected to be energized from the system operative to exert on said member an effect dependent on the normal value of an electric quantity of the system and on the occurrence of a predetermined fault on the system an effect dependent on the abnormal value of said quantity consequent upon said fault, fault responsive means connected to be energized from the system to exert on said member an effect dependent on the value of another electric quantity of the system due to the occurrence of a different kind of fault on the system, and means responsive to one of said fault conditions for reducing the effect of the fault responsive means responsive to the other fault condition.

9. In combination with an alternating current system, a movable member, interphase fault responsive means connected to be energized from the system operative to exert on said member an effect dependent on the phase fault power flow of the system, ground fault responsive means connected to be energized from the system operative to exert on said member on the occurrence of a ground fault on the system an effect dependent on the ground fault power flow, and means responsive to one of said fault conditions for reducing the effect of the fault responsive means responsive to the other fault condition.

10. In combination with an alternating current system, a movable member, electroresponsive means connected to be energized from the system operative to exert on said member an effect dependent on the current of the system, fault responsive means connected to be energized from the system to exert on said member an effect dependent on the value of another electric quantity of the system on the occurrence of a predetermined fault on the system, and means for impairing the effect of said electroresponsive means on the occurrence of said predetermined fault.

VICTOR E. VERRALL.